R. C. DUGUID.
VEHICLE WHEEL.
APPLICATION FILED MAR. 6, 1909.
953,780.
Patented Apr. 5, 1910.
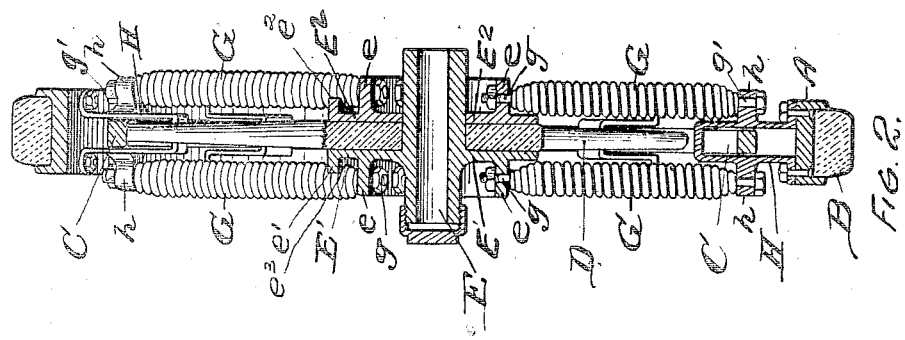
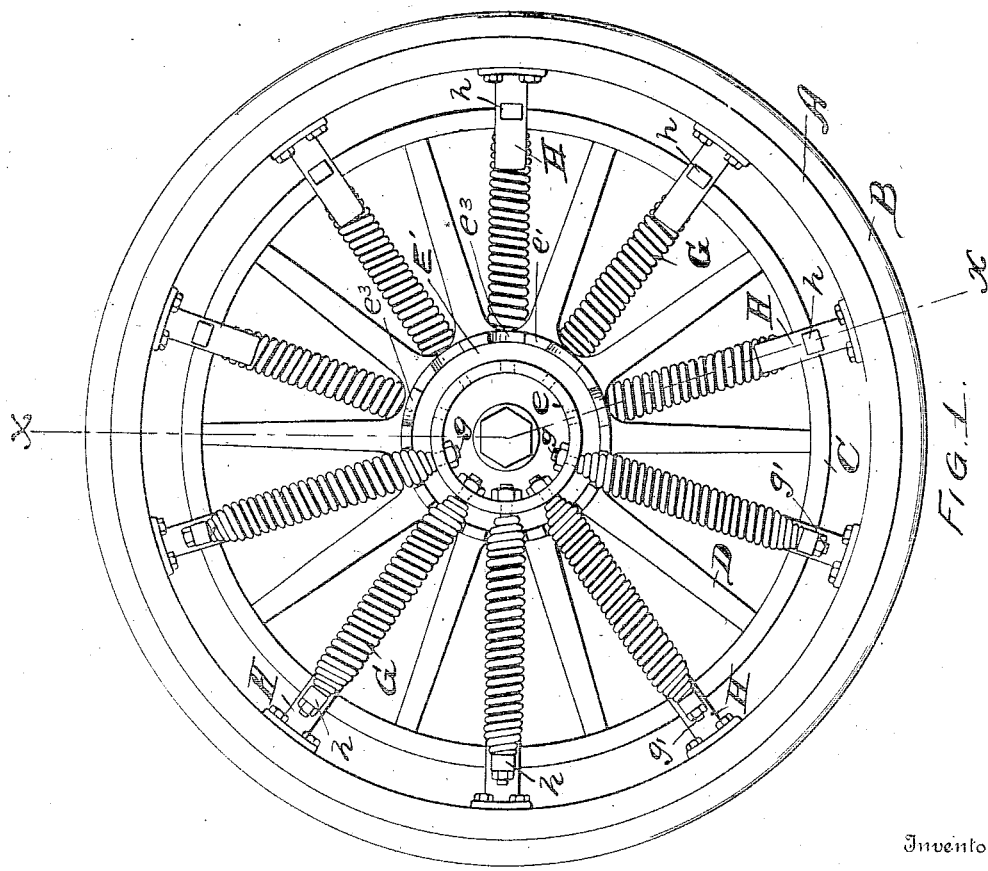

UNITED STATES PATENT OFFICE.

ROBERT C. DUGUID, OF DETROIT, MICHIGAN, ASSIGNOR TO DELL WARD, OF DETROIT, MICHIGAN.

VEHICLE-WHEEL.

953,780.  Specification of Letters Patent.  Patented Apr. 5, 1910.

Application filed March 6, 1909. Serial No. 481,754.

*To all whom it may concern:*

Be it known that I, ROBERT C. DUGUID, citizen of the United States, residing at Detroit, county of Wayne, State of Michigan, have invented a certain new and useful Improvement in Vehicle-Wheels, and declare the following to be a full, clear, and exact description of the same, such as will enable others skilled in the art to which it pertains to make and use the same, reference being had to the accompanying drawings, which form a part of this specification.

My invention relates to an improvement in that type of vehicle wheels in which a "floating wheel" is concentrically supported within an outer rim or wheel by a plurality of radially arranged helical springs connected at one end to the hub of the inner wheel and at their opposite ends with the encircling rim or wheel.

One of the objects of the present invention is so to construct and arrange the parts that helical springs of a greater length may be employed on wheels of a given diameter than have heretofore been possible, thereby greatly increasing the resiliency of the springs and enlarging their usefulness as shock absorbers.

Another feature of the invention consists in assembling the springs in pairs, one on each side of the floating wheel, by means of which the parts are more perfectly balanced.

Another feature is the ease with which a spring may be removed or inserted in the event of it being necessary to make repairs.

Other advantages and improvements will hereafter appear.

In the drawings accompanying this specification:—Figure 1 is a side elevation of a wheel in which certain of the radiating springs have been removed in order to show those on the other side of the "floating wheel" that lie in the same plane with those that have been removed. Fig. 2 is a cross-sectional view through the wheel on line X—X of Fig. 1.

Referring now to the letters of reference spread upon the drawings:—A is the outer rim or wheel in which is mounted the tire B.

C is the felly of the floating wheel.

D are its spokes, and E is its hub having a projecting flange E' integral therewith.

$E^2$ is an annular disk mounted on the hub E and between the flange E' and said disk $E^2$ are secured the inner ends of the spokes D. Projecting from the side of the flange E' and also from the disk $E^2$ are annular rims $e$ integral therewith, both being perforated to receive the bolts $g$ employed to secure the ends of the helical springs G to the hub.

$e'$ is a projecting rim formed at or near the periphery of the flange E' and $e^2$ is a similar rim formed at or near the periphery of the annular disk $E^2$. These rims are provided with depressions $e^3$ for the passage of the springs G,—the purpose being to partially embrace the helical springs and thus relieve the strain on the bolts $g$ that secure the springs to the hub portion. It will be readily understood that otherwise the strain due to any slight rotary movement of the floating wheel would be directly upon the bolts securing the annular rim $e$. By shaping the rim $e'$ to partially embrace the springs, the bolts are relieved of the strain.

H are a plurality of relatively long yokes straddling the felly of the floating wheel (within which it is free to move) and bolted to the inner face of the encircling rim A. These yokes are each provided with perforated lugs $h$ projecting from their sides and to which the outer ends of the helical springs are secured by means of bolts $g'$. By locating the lug on the yokes near the point of attachment to the outer rim A, springs of greater length may be employed thereby increasing their efficiency as shock absorbers. I find, however, that the construction shown is adapted to receive springs of sufficient length to afford the proper amount of resiliency.

Having thus described my invention, what I claim is:—

1. In a vehicle wheel, a hub portion, annular rims carried by the hub portion, spokes, a felly, a concentric rim spaced from the felly, a plurality of yokes secured to the rim and encircling the felly, the side walls of said yokes provided at substantially midway of their ends with projecting lugs adapted to receive the ends of springs, a plurality of springs each respectively secured at one end to one of the annular rims of the hub portion, each spring extending beyond the closed end of the yokes and secured at their opposite ends respectively to the lugs of the several yokes.

2. In a vehicle wheel, a hub portion, an annular rim carried by the hub portion, a felly, a concentric rim spaced from the felly, a plurality of yokes secured to the rim and encircling the felly, said yokes having projecting lugs on each of their side arms midway their length, and a plurality of springs arranged in pairs one on each side of the felly, their inner ends being secured to the rim of the hub portion, their outer ends extending beyond the closed ends of the yokes and respectively secured to the projecting lugs of the several yokes.

3. In a vehicle wheel, a hub portion, an annular rim supported by the hub portion, a felly, a rim spaced from and concentric to the felly, a plurality of yokes spaced from and embracing the felly, each of their side arms provided with projecting lugs spaced midway of their length, a plurality of springs secured at one end to the annular rim and at their respective opposite ends secured to the lugs of the several yokes, and an annular rim concentric to the first named rim provided with depressions to partially receive the springs lying in said depressions.

4. In a vehicle wheel, a hub portion, an annular rim supported by the hub portion, a felly, a rim spaced from and concentric to the felly, a plurality of yokes secured to the last named rim and embracing the felly, a plurality of springs secured at one end to the annular rim and at their respective opposite ends secured to each of the several yokes, and an outer annular rim concentric to the first named rim provided with depressions to partially receive the springs lying in said depressions.

In testimony whereof, I sign this specification in the presence of two witnesses.

ROBERT C. DUGUID.

Witnesses:
  GRACE E. WYNKOOP,
  SAMUEL E. THOMAS.